(No Model.)
J. M. BOLTON.
APPARATUS FOR MAKING STEAM PIPE COVERINGS.
No. 555,071. Patented Feb. 25, 1896.
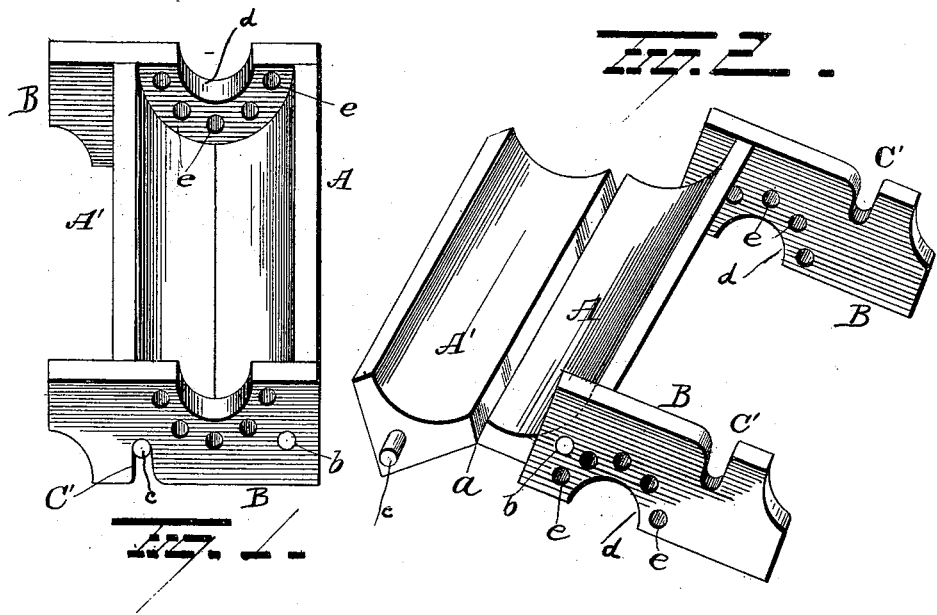
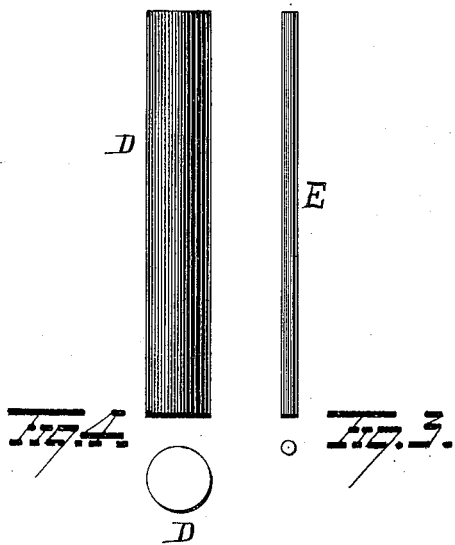
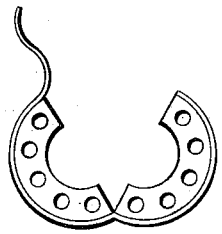
Witnesses
E. J. Nottingham
G. F. Downing
Inventor
J. M. Bolton
By H. A. Seymour
Attorney

UNITED STATES PATENT OFFICE.

JAMES M. BOLTON, OF SIOUX CITY, IOWA.

APPARATUS FOR MAKING STEAM-PIPE COVERINGS.

SPECIFICATION forming part of Letters Patent No. 555,071, dated February 25, 1896.

Application filed January 28, 1895. Serial No. 536,426. (No model.)

*To all whom it may concern:*

Be it known that I, JAMES M. BOLTON, of Sioux City, in the county of Woodbury and State of Iowa, have invented certain new and useful Improvements in Apparatus for Making Steam-Pipe Coverings and the Product; and I do hereby declare the following to be a full, clear, and exact description of the invention, such as will enable others skilled in the art to which it appertains to make and use the same.

My invention relates in general to the manufacture of steam-pipe coverings made from asbestos pulp or any other suitable material, the said steam-pipe covering to contain a succession of dead-air chambers.

The principle object of my present invention is to provide comparatively simple and efficient apparatus for making steam-pipe coverings containing dead-air chambers which shall add to its efficiency as a non-conductor of heat.

My invention relates to an improvement in molds for forming steam-pipe coverings, the object being to provide a simple device for receiving the cores and the plastic material in which the cores are to be embedded and which is to constitute the covering; and it consists in certain novel features of construction and combinations of parts, which will be hereinafter described, and pointed out in the claims.

In the accompanying drawings, Figure 1 is a view in perspective of the mold in its operative position. Fig. 2 is a similar view showing the parts open. Fig. 3 is a view showing one of the small cores. Fig. 4 is a similar view of a large-sized core, and Fig. 5 is a cross-section through a portion of the pipe-covering.

A A' represent the two sections of the mold, their adjacent edges $a$ $a$ being hinged together.

B B are the ends. These ends are hinged at $b$ to section A and provided with hooks $c'$ $c'$ adapted to receive pins $c$ on the ends of section A', whereby to lock the parts together in their normal position, as shown in Fig. 1. When in this position the lower surfaces of parts A A' and the lower edges of the ends B B are all in alignment, forming a flat bottom on which the mold rests.

The ends B are provided with a series of holes $e$ $e$, arranged preferably in the form of a semicircle, and in these holes the smaller rods or cores E are placed just prior to the placing of the plastic material in the mold. When thus placed in endwise, of course, the plastic material of which the pipe-covering is composed and to be formed is put in the mold, the mold being preferably lined with paper first to prevent sticking. Then the larger central core D is placed in the seats or rests $d$ $d$. The act of seating this central core forces the plastic material into all the corners and recesses of the mold and by the aid of a trowel or similar device the material is spread out, packed in place, and made smooth. Finally after the plastic material has had time to set and harden, the cores are removed and the section of covering formed is removed by the opening of the mold, as indicated in Fig. 2. In this manner the covering is made in half-sections with dead-air spaces running their entire length, and the covering thus formed is light and most efficient.

If desired, all the core-rods might be connected together in one piece, so as to be withdrawn together.

Having fully described my invention, what I claim as new, and desire to secure by Letters Patent, is—

1. A mold for pipe-coverings consisting of two side sections and end sections, the end sections being movably connected to the side sections in such manner as to lock them in position when set in their normal position, substantially as set forth.

2. A mold for pipe-coverings comprising two approximately quadracircular side sections connected together, movable end sections adapted to swing into position to lock the side sections together, said end sections having holes therein adapted to receive cores, and cores removably secured in said holes.

In testimony whereof I have signed this specification in the presence of two subscribing witnesses.

JAMES M. BOLTON.

Witnesses:
A. C. LAROANE,
GEO. H. HOWELL.